INVENTOR.
GEORGE MORDWINKIN

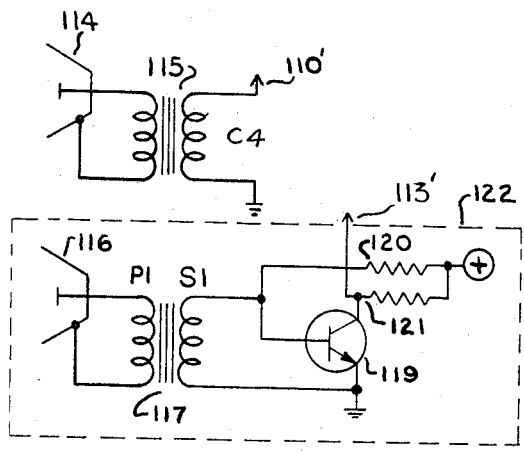
FIG. 3
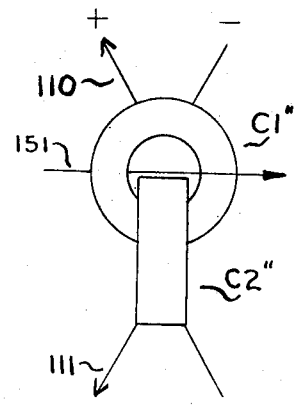
FIG. 5a
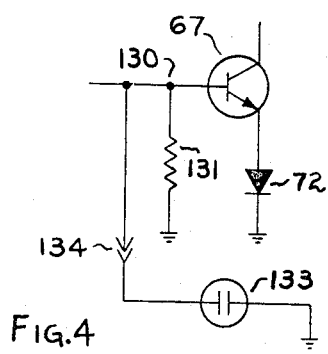
FIG. 4
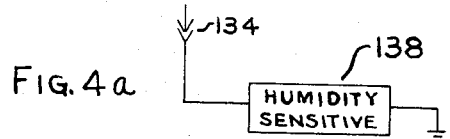
FIG. 4c
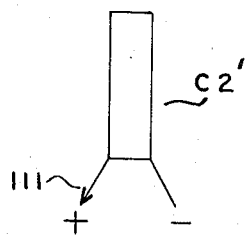
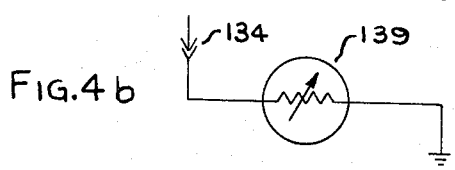
FIG. 4a
FIG. 4b
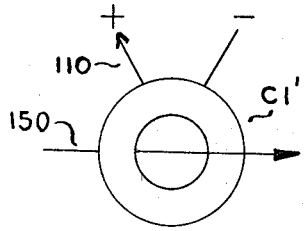
FIG. 5
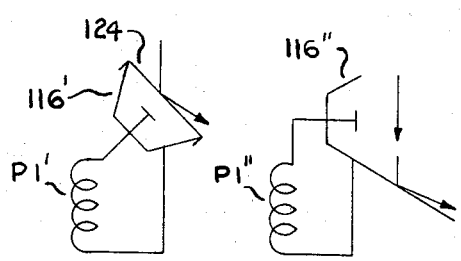
FIG. 3a   FIG. 3b

United States Patent Office 3,380,044
Patented Apr. 23, 1968

3,380,044
UNIVERSAL-SENSOR CONTROL SYSTEM
George Mordwinkin, Norwalk, Conn., assignor to Sensor Corporation, Greenwich, Conn., a corporation of Connecticut
Filed Sept. 4, 1964, Ser. No. 394,589
23 Claims. (Cl. 340—213)

The present invention relates to detection and control systems. More particularly the present invention may be broadly referred to as a universal-sensor detection device and control system which may employ one of a variety of different type sensing modes or devices for detecting, counting and/or controlling, particularly industrial production devices and/or production systems which are partly or wholly automated. The present detection device and control system may be employed as a system per se, to detect and count unit production in any one of a variety of stages of production through the use of one of a variety of detection modes and may, as a complete system, serve as an integrated monitor or supervisory system over a production device system or operation.

In another mode of use, the present invention may serve as an industrial production unit or piece counter which may employ any one of a variety of different type sensing modes for detecting and counting production units in any stage of a production system.

In a further mode of use the present invention may be employed as a machine monitor and/or supervisor-controller which may monitor the operating machine and, through a selected type of sensing device, control the quality and/or quantity of production of an automated or semi-automated machine or device and also may serve as a safety or protection device for the machine and/or operating personnel.

The use of counting and detecting devices in industry is wide spread. Various types of switches and sensing modes or devices are employed to generally count pieces or units of production produced by a mechanical device or an assembly line. Some such counters and/or detecting devices are common counters and are built into a machine or are an accessory to such machines. Other devices employ photo-sensitive type detectors or sonic type detectors such as impact detectors or transmitter-receiver type detectors, which may provide a detection impulse in response to a predetermined cyclic step in the cycle of operation of the device or a certain phase of the production operation.

However, presently available detection or counting systems are generally designed to be operated by a particular mode of sensing device and the circuitry used in connection with a sonic detector, for example, could not normally be employed substituted in combination with a photo sensitive detector, for example. In other words the feature of interchangeability of sensing modes is unavailable.

Because of the variety of different conditions which may surround various production activities, that is relative to temperature, dust, oil, noise, magnetic disturbance and/or accessability to one particular place or space problem, it is normally found that a counting device employing one mode of detection device may not be universally employed throughout the industrial field. In fact, one plant or manufacturing facility may have various "climatic," environmental or operational conditions through the production cycle so that a type or mode of sensor that may be employed at one stage of production may not, because of different environmental conditions, be employed at some other stage in the same production cycle. Actually the various environmental and/or operational conditions may dictate the type or mode of sensing that may be employed in any detection and/or counting device used. Thus, in one production system, it may be necessary to employ several different modes of sensor, at various places, and interchange of the detection devices as by relocation may not be conveniently accomplished. It is most often necessary to provide entirely different sensing devices so that a plurality of different type control units must be purchased, and maintained without the benefit of being able to interchange the circuitry of the various units.

My novel detection device and control system avoids the necessity of selecting a device or system according to the dictates of the environmental and/or operational conditions under which the device is to operate. My universal-sensor detection device may employ any one of a variety of modes of sensing any one of which is interchangeable for use with the same basic circuitry of the detector unit so that a complete detection device or system may be easily and quickly adapted to perform its function over a wide range of environmental, operational and/or production conditions. Further, since the same basic circuitry is employed in each unit, to which the particular mode of sensor is connected, the necessity of selecting, maintaining and stocking replacement parts for several entirely different detector units is avoided.

In addition to being easily and readily adaptable to various production conditions, the present invention has great versatility in that information relative to production quantity, i.e. number of pieces or units of production produced, production quality and control over automated and/or semi-automated machines, devices and systems is available in the form of automatic outputs, each output being selectable, as desired, either singularly or in combination. This type of information is an important part of an automated or semiautomated production system whether it is a single machine, or a group of machines, such as stamping machines, etc., or an assembly line or system.

In addition to the above described advantageous features, the units which comprise my universal-sensor detection device are small, compact and light in weight so as to be portable and easily relocated. Solid-state components are employed in the circuitry thereby providing a device which has unlimited life and low power consumption. Connection to normal house current may be made for providing power to drive my device while provision is also made for battery powered operation, when normal house current is unavailable.

It is a principal object of the present invention to provide a universal sensor detection and control device which may employ any one of a variety of types of sensors.

Another object is to provide a universal sensor detection and control device which may be employed for detecting, counting and controlling piece production which employed a common basic circuit for any of a variety of sensor heads.

Another object is to provide a universal sensor detector and control system which may employ any of a variety of types of sensor heads so that the particular sensor head used with the basic circuitry may provide a detector counter and control system which may be employed in any of a variety of production conditions.

A further object is to provide a universal sensor detector which employs an oscillator driver for certain types of sensor heads in which part of the sensor head serves as part of the oscillator.

Still another object is to provide a universal sensor detection device which may employ more than one sensor, with each sensor feeding into a different part of the basic circuitry.

Still further object is to provide a universal sensor detector control and counter device which provides both digital and analog value outputs in response to detection of a production piece.

A further object is to provide a universal sensor detection control and counting system in which all or part of the basic circuitry of the detection circuit may be employed according to the type of sensing head used.

Still a further object is to provide a sensor detection and control system which may include a sensor head which requires an oscillator driver and under such conditions part of the sensor head serves as part of the oscillator driver and the frequency of oscillation of the oscillator driver is at resonance with the inductance in the sensor head, which serves as part of the oscillator driver circuit.

Another object is to provide a sensor detector counter and control device which includes basic circuitry for counting detection impulses and controlling industrial or other devices in which the basic circuitry has a plurality of stages and any one of a variety of sensor heads may be employed as impulse providing sensors at various stages of the basic circuit.

A still further object is to provide a universal sensor detection control system which employs basic circuitry for receiving detection impulses from any one of a variety of types of sensor heads, and in which the type of sensor head may be changed according to the industrial production operational conditions without changing the basic circuit.

These and other objects will become apparent from reading following detailed description with reference to the accompanying drawings in which:

FIG. 3 is a schematic circuit diagram of one form of a sonic or ultra-sonic sensor head which may be substituted for the inductive proximity sensor head illustrated in FIG. 2;

FIG. 3a is a schematic circuit diagram of one form of impact sensor head;

FIG. 3b is a schematic circuit diagram of another form of impact sensor head;

FIG. 4 is a schematic circuit diagram of a photo conductive sensor head with a portion of the circuit of FIG. 2 illustrated to show the connection thereto;

FIG. 4a is a diagram of a humidity sensitive sensor head which may be substituted for the photo-conductive sensor head;

FIG. 4b is a diagram of a temperature sensitive sensor head, which is represented as a thermistor, which may be used with the basic circuit;

FIG. 4c is a representation of one form of electro-mechanical sensor head which may be used with the basic circuitry;

FIG. 5 is a diagram of one form of dual coil inductive proximity sensor head;

FIG. 5a is a diagram of an alternate form of dual coil inductive proximity sensor head;

Figure 1:
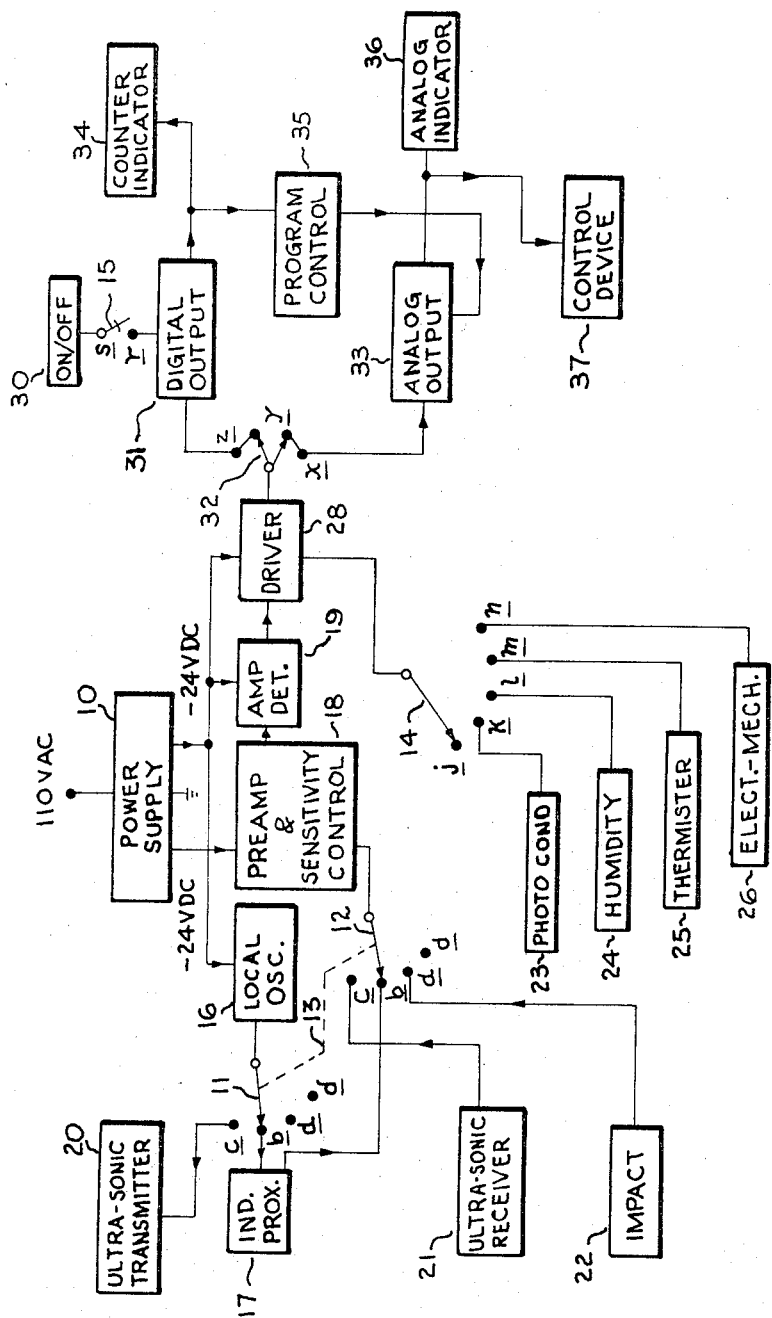
FIG. 1 is a block diagram of the universal sensor detector and control system.

Referring to FIG. 1 a block diagram of the universal sensor detection and control system is presented. The power supply, block 10 may be connected to a 110 volt alternating current (110 AC) supply, which may be normal industrial control current. The AC input may vary as normal industrial control current varies, however, an output of −24 volts direct current (−24 v. DC and +24 volts direct current (+24 v. DC) is provided for operating or driving the circuit of the device. In the alternative, the power supply may be in the form of a 48 volt battery from which the driving voltages may be obtained for providing a fully portable and self-sustaining system. In alternate circuitry the −24 v. DC power has been eliminated, as more fully described below.

The block diagram includes the switches 11 and 12, which are jointly operable as indicated by broken line 13. The switches 14 and 15 are individually operable. Although the switches 11, 12, 14 and 15 are shown, it should be understood that the various sensor components would ordinarily be individually plugged in, or otherwise connected to the corresponding circuitry rather than having selection of the various sensor modes as represented in the block diagram.

The switches 11 and 12 are represented as two four position, jointly operable switches, having positions a, b, c and d each. The switch 12, represented in its position b couples block 16, the local oscillator to block 17, representing an inductive proximity sensor. As will be seen more clearly in the circuit diagram the oscillator actually includes block 16 and part of block 17 when switch 11 is in its position b.

As will further be more fully described below, block 17 represents one of several forms of inductive proximity sensors that may be employed, as desired, for detection purposes. The switch 12, in its position b couples the circuit represented by block 17 to the block 18, represents a pre-amplifier and sensitivity control circuit.

With the switches 11 and 12 in their positions c, block 20, representing an ultra-sonic transmitter is coupled to block 16 and the oscillator then actually includes block 16 and part of block 20. Block 21, ultra-sonic receiver is coupled to block 18 in position c via switch 12 thereby providing an ultra-sonic sensor mode of detection.

In position a the local oscillator is effectively uncoupled from the sensor, as seen by switch 11, and block 22, impact mode sensor is coupled to the pre-amplifier sensitivity control block 18.

In position d the switches 11 and 12 are both open so that other modes of sensors may be selected for use.

With the switches 11 and 12 in positions a, b, or c, the switch 14 would be in position j, which is essentially an open position, and switch 15 would be in position r which is essentially an open position. However, with switches 11 and 12 in their position d and switch 15 in its position r, other modes of sensing may be selected, other than above described as by positioning of switch 14 to position k, l, m, or n.

Assuming switches 11 and 12 to be on position d and switch 15 to be on position r switch 14 may be positioned to k and thereby couple block 23, photoconductive (sensor), to the block 28, driver. In position l switch 14 couples block 24, humidity (sensor) to block 28, in position m, block 25, thermistor is coupled to block 28, and in position n block 26 representing an electro-mechanical sensor is coupled to block 28.

With switches 11 and 12 in position d and switch 14 in position j then switch 15 may be positioned to s which couples the block 30 to the block 31, digital output. Block 30, on/off, represents a classification of on/off type sensors which may, for example, close a pair of normally open contacts or, open a pair of normally closed contacts upon actuation. This general on/off classification may include probe type, contact type, limit switches, etc.

The sensors represented by blocks 17 and 20/21, the latter two used in combination, may be generally classified and further include types of sensors that may require an oscillator as a driver, the inductive proximity made of sensor being typical of such type. The block 22, impact, represents a general classification of sensor which may not require an oscillator drive but may require that the detection impulse be amplified by one or more stages. In this group such sensors as microphonic, photo-voltaic cells, strain gauge, load load sensors, thermocouple, etc. are typical detection devices.

The blocks 23–26 represent another classification of mode of sensing which may be generally described as variable resistance sensors. These may include the photoconductive cell, humidity sensor, thermistor, hall-effect devices, potentiometer, etc.

The switch 32, represents a selector switch that may select both digital output and analog output, in position $y$ of the switch 32 or digital output only, as in position $z$ or analog output only as in position $x$. Thus selection of output may be made in accordance with the functional requirement of the device, whether the function be for controlling, counting or a combination of controlling and counting.

As seen by the block diagram, basic circuitry, shown in other figures and described below, is employed with any one of a plurality of modes of sensors with additional selection made from among a plurality of sensors of the same mode.

When employing a sensor that may require a driver-oscillator, such as block 17, for example, switches 11/12 would be positioned on $b$ with switches 14 and 15 on positions $j$ and $r$ respectively. A detection impulse from block 17 will be applied to block 18, via switch 12, for amplification. The block 18 which also represents a sensitivity control has applied thereto −24 v. DC power and +24 v. DC power, the latter power also being applied to block 16, 19 and 28. The detection impulse from block 18 is applied to an amplifier-detector, block 19 which feeds into a driver, block 28. The output of the driver is applied, via selector switch 32 to either or both blocks 31 and 33 the digital output and analog output respectively, in accordance with the position of selector switch 32. The output of the digital control, block 31 is applied to a counter or indicator block 34 which provides a count indication. The digital output may also be applied to a program control, block 35 which for example may be a decade counter or stepping switch or other counter or stepping device which may provide an output when a preselected count is detected by such counter. The output of block 35 may be applied to the block 33, analog output which may actuate the analog output and/or serve as an over-ride control. The output of the block 33, analog output, may be applied to block 36, analog indicator, and/or to the block 37, control device. The control device may be in the form of functional control for a machine such as a speed control or a position control, etc. The analog indicator may be in the form of an alarm or meter or other indicator, which may serve as a safety and/or protection device.

When employing the ultra-sonic sensor, the block 20 would be coupled to block 16 via switch 11, position $c$ and would transmit a signal of ultra-sonic frequency, for example. The block 21 would be coupled to block 18 via switch 12, position $c$, a detection impulse from the block 21 being applied to block 18, for amplification. The amplified signal from this mode would be applied in similar fashion as described above.

When using block 22, impact sensor, the oscillator-driver is not employed to drive the sensor, the impact impulse being applied through position $a$ of switch 12 to the pre-amplifier and sensitivity control and through the circuit functions as described above.

When employing any of the sensors represented by blocks 23–26 the detection impulse is seen as another type of signal and the blocks 16, 18 and 19 are not necessary for operating the device. Thus the sensor detection impulse of the detection device is applied directly to the driver, block 28. Although blocks 16, 18 and 19 of the circuitry of the detection device are, in effect, not used with this mode of sensing and could be eliminated, the entire circuitry, including blocks 16, 18 and 19 are to be included in the preferred system since this provides a detection controller which may use any one of the various sensors of the various modes of sensing.

When any of the sensors represented by blocks 23–26 are employed the detection or sensing impulse will be applied to block 28, driver which will provide an output to the block 31 and/or block 33, for providing a digital and/or analog output.

When using block 30 as a sensor, switch 15 would be positioned to $s$ and switches 11 and 12 to $d$ with switch 14 to position $j$. The sensor represented by block 30 provides an impulse applied directly to the block 31 which may operate the block 34 to provide a count indication and the block 35 which may be used to provide control over the analog output, block 33 which in turn may control the blocks 36 and 37.

Thus, by my block diagram I have shown a universal-sensor detection control system which may employ any one of a plurality of modes of sensing, out of which a particular sensor may be selected. Obviously, such device would be constructed so that the selected sensor would be jack-plug connected by a multi-prong, jack-plug arrangement. I will not describe the circuitry represented in block form in FIG. 1.

Figure 2:
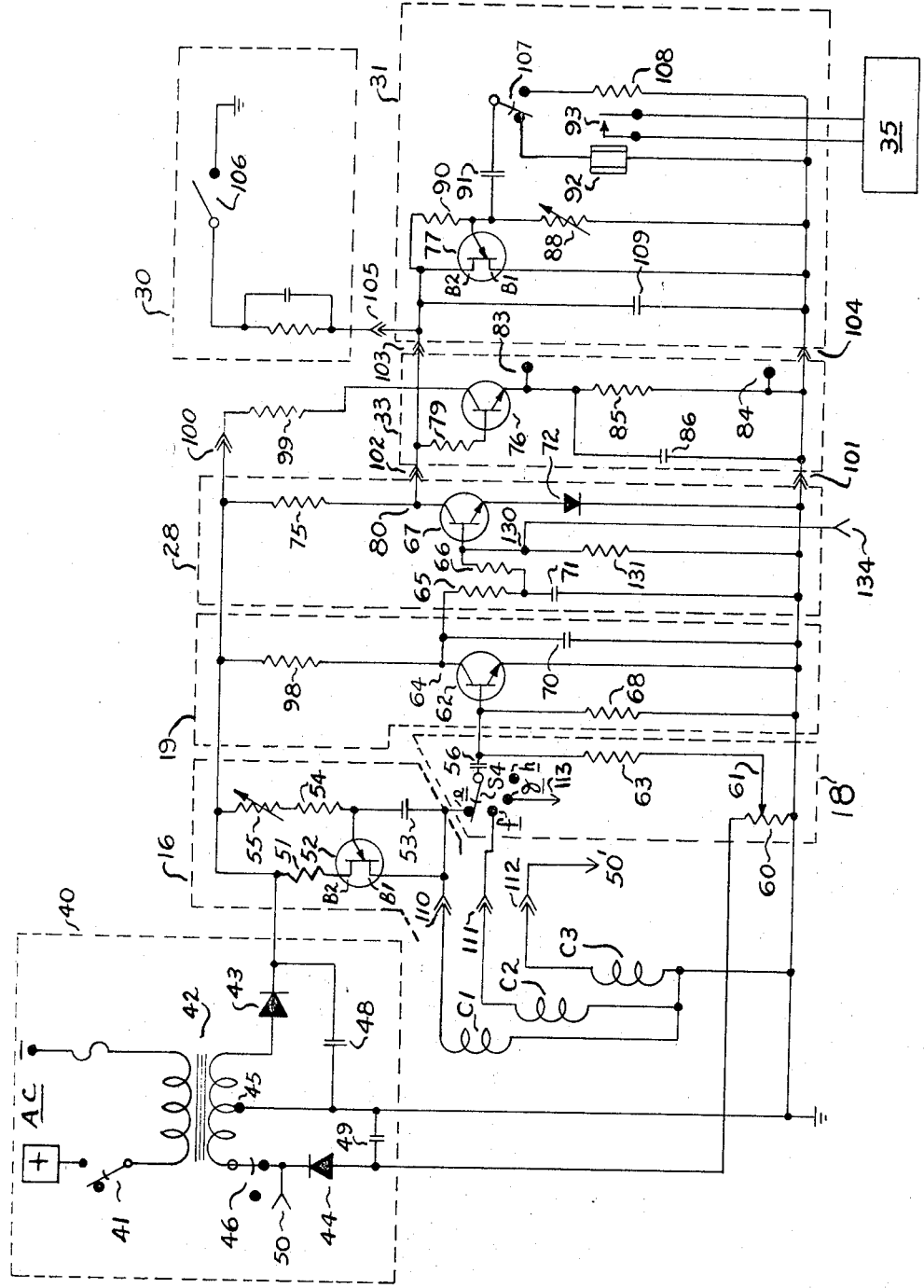
FIG. 2 is a schematic circuit diagram of the preferred basic circuit with an inductive proximity sensor head coupled to the circuit and on/off type sensor illustrated as connectable to the basic circuit.

Referring to FIG. 2 one form of the present invention is presented, in preferred circuit arrangement, in which a triple winding or coil inductive proximity sensor is coupled to the detection circuitry of the universal-sensor detection and control system (windings C1, C2 and C3).

Broken line block 40 illustrates a power supply which is driven by normal 110 volt alternating current (AC 120 v.) which, when the master switch 41 is closed energizes the transformer 42. The circuit, through the primary coil of 42, may be fused, as illustrated.

Diode 43 passes the positive portion of the power induced in the secondary coil of transformer 42 and diode 44 passes the negative portion of such power while terminal 45 illustrates the common return which is referred to as ground. The capacitors 48 and 49 serve as filters for the positive direct current (DC) and the negative DC passing through diodes 43 and 44 respectively.

The broken line block 16 illustrates the local oscillator which block is open at the lower left. When an inductive proximity head or sensor is employed in conjunction with the detection circuitry one of the windings (C1) of the triple winding proximity head serves as part of the oscillator circuit, as well as being part of the sensor head.

A unijunction transistor 52 is connected with its base-two (B2) to positive power through resistor 51 and its base-one (B1) returned to ground through the winding or coil C1 of the proximity head. The emitter is coupled to base-one (B1) through a capacitor 53 with the emitter also coupled to positive power through fixed resistor 54 and adjustable resistor 55.

The usual fundamental frequency range of the oscillator is preferable between 20,000 cycles per second to 42,000 cycles per second, however the final selection of the fundamental frequency depends upon the resonant frequency of the inductive proximity sensor coil, C1. In its preferred form, with an inductive proximity sensor head or with an ultra-sonic sensor head (as seen in FIG. 1 either an inductive proximity head or an ultra-sonic head may be used), the coil, (either the inductive proximity coil or the coil of a transformer, in the ultra-sonic transmitting circuit, the latter being described below), should be resonant at the fundamental frequency of the oscillator.

Winding coil C2 is coupled between the return and position $f$ of switch S4 and thence to capacitor 56. Winding or coil C3 is coupled between the return and the potentiometer 60/61 via diode 44 as indicated by the jack-plug connections 50' and 50 respectively. Energy is transferred from C1 to C2 and C3 by induction. In this arrangement switch 46 is positioned to its position.

In its preferred form, the base-one of unijunction transistor 52 and the emitter terminals are coupled through timing capacitor 53. This circuit arrangement provides a path for the discharge current of the capacitor through the transistor, rather than returning the discharge current to ground through coil C1. Also, such arrangement provides substantially pure sinusoidal wave forms across coil C1, such waves being substantially free from harmonic and spurious signals since the coil C1 sees only the variable resistance of the unijunction transistor 52. Resistor 51 serves as a temperature compensating stabilizing element. Thus I have provided a free running unijunction transistor oscillator generating a relatively pure sinusoidal wave form across the coil thereof, substantially free of phase shift, in which the coil (C1) serves as part of the oscillator and, at the same time, part of the inductive proximity head.

Adjustable resistance 55 serves for adjusting the frequency of the oscillator and may be adjusted so that the frequency of the oscillator is below the resonant frequency of coil C1; at the resonant frequency of coil C1, or above the resonant frequency of coil C1. This finds utility in detecting ferrous materials, non-ferrous metal or both ferrous and non-ferrous metals.

For example, if it is desired to sense both ferrous and non-ferrous metals, the resistor 55 may be adjusted so that the oscillator frequency will be at resonance with the coil C1. To sense non-ferrous metal and to avoid sensing ferrous material the resistor 55 may be adjusted so that the frequency of the oscillator is lower than resonance. To sense ferrous material and avoid sensing non-ferrous material the resistor 55 may be adjusted so that the frequency of the oscillator is higher than resonance.

In the preferred arrangement, the detection signal provided is a signal of decreasing amplitude. When the oscillator frequency is at resonance with the coil C1, the presence of ferrous material in the magnetic field of the sensor head will detune the coil C1 so that the oscillator frequency will increase above the resonance frequency and the amplitude of the signal will decrease. The presence of non-ferrous metal in the field of influence of the sensor head will detune the coil C1 so that the oscillator frequency will decrease below the resonance frequency and the amplitude of the signal will decrease.

The selective sensing of ferrous and non-ferrous metals is possible because of the opposite reaction developed in the inductive proximity head to the presence of the respective metals.

The triple winding or coil inductive proximity sensor head also finds utility in proximity sensing per se. The degree of sensitivity found in such triple coil arrangement may be used to determine distance or spacing between the proximity sensor head and an actuable metal and the amount of decrease in amplitude of the detection signal or impulse may serve as a measure of such spacing in the analog output provided by the present device.

Dual coil arrangements of an inductive proximity sensor head which may serve as sensor heads will be discussed relative to FIGS. 5 and 5a.

When a triple coil inductive proximity sensor head is employed the switch S4 is in contact with position $f$, so that energy induced in coil C2 is applied through switch S4 to the capacitor 56. Coil C1 is coupled between the return and base one of transistor 52. Coil or winding C3 is coupled between the return and diode 44 via jack-plug connection 50/50′. With the switch 46 open the negative portion of the high frequency developed in the oscillator circuit is applied through diode 44 to the resistance 60 of the potentiometer 60/61. This arrangement provides an automatic bias adjustment to the following amplification stage, and provides a dampening effect on excessive detection signals developed in the sensor head. This also provides great stability against drift of the amplification stage of the detection circuit and compensations for slow signal variations due to temperature changes.

Adjustable resistor 60 is coupled between the diode 44 and the common return. The arm 61 may be adjusted so as to select a negative value direct current (DC) for application to the base of transistor 62, through resistor 63, for providing bias. The adjustment of arm 61 on the variable resistor 60 may be considered a sensitivity control adjustment since such bias, as applied to the base of transistor 62 may overcome a decreasing amplitude positive DC voltage so as to drive the normally conducting transistor 62 to cut off.

The input signal, in response to the detection of presences or passage of the "piece" to be detected, is induced from C1 to C2 and is fed from the coil C2 through position, $f$ switch S4, capacitor 56 to the base of transistor 62. The input signal, which is positive with respect to the return is overcome, by the negative bias thereby driving 62 to cut off when a detection signal of decreased amplitude is applied to the base. When transistor 62 is driven to cut off the junction 64 is driven toward positive potential which potential is applied through series resistors 65 and 66 to the base of transistor 67. The resistor 68 between the base of transistor 62 and the return serves as a base return resistor. Capacitor 70 filters the high frequency components at the junction 64 to ground and essentially converts the potential at junction 64 into a variable DC. The network of capacitor 71 (connected between the series resistors 65 and 66 to ground), and the resistors 65 and 66 provide additional filtering action.

Transistor 67 is normally held non-conductive due to the ground potential normally applied from junction 64. Diode 72 connected between the emitter of 67 and ground provides temperature stabilization. When transistor 67 is nonconducting the potential at junction 80 is positive and transistor 76 is held conducting, with its output at 83 above ground in a positive direction.

The positive going potential at junction 64 is applied to the base of transistor 67 driving transistor 67 to conduction.

Resistor 75, in the collector circuit of transistor 67 is also connected to the base of transistor 76 (via resistor 79) and to the base-two (B2) terminal of unijunction transistor 77.

When transistor 67 conducts, the junction 80 becomes less positive, driving the output of emitter-follower transistor 76 less positive. With transistor 76 in a non-conductive state the terminal 83 is essentially at ground potential, that is essentially the same as terminals 80 and 84. However, when transistor 76 conducts, the potential at terminal 83 increases, positively and because of resistor 85 between the two terminals 83 and 84 the value of the potential difference between terminal 83 and 84 is essentially inversely proportional to the value of the input signal. Resistor 85 is preferably a minimum load impedance of the order of 2000 ohms, across which an analog value may be obtained.

If desired, a meter may be substituted for the resistor 85 which may indicate the value of the potential difference between terminals 83 and 84. The output across the terminals 83 and 84 is therefore essentially an analog output.

Unijunction transistor 77 is normally held some 2 volts below its firing level by adjustment of the variable resistor 88, connected between the emitter terminal of 77 and ground.

In order that transistor 77 may fire, the inter-base voltage should suddenly decrease.

Thus as the potential at terminal 80 decreases, from a positive potential toward ground, unijunction transistor 77 fires. The resistor 90 and capacitor 91 form an RC timing circuit for resetting the mono-stable multivibrator circuit formed by the unijunction transistor 77, as connected herein.

When transistor 77 fires the relay 92 coupled through capacitor 91 to the emitter of 77 is energized thereby closing contacts 93. This essentially provides a digital output that may advance step-by-step, a digital or other stepping circuit such as represented by block 35 in FIGS. 1 and 6.

Thus I have shown how the presence or passage of a "piece" or "unit" to be detected may provide both an analog and a digital output. Obviously, the triple coil inductive proximity sensor would be located so that the piece or unit to be detected would pass through the electromagnetic field around the coils and, as previously described the variable resistor 55 may be adjusted so that the inductive proximity head may detect both ferrous and non-ferrous metals, ferrous material only or non-ferrous metal only.

The digital output may serve for counting purposes and the analog output may serve to determine the value of the input signal caused by passage of the piece or unit to be detected.

If it is desired to provide an analog output and eliminate the digital output the jack-plug connections at 103 and 104 may be opened so as to essentially disconnect the digital response circuitry, block 31.

If it is desired to provide a digital output and eliminate the analog output the jack-plug connections at 100, 101 and 102 would be open and the "female" sections of the jack-plug connections of 103 and 104 would be separated from their shown positions and connected with the "male" sections of 102 and 101 respectively. This would disconnect block 33 and essentially plug in block 31 in place thereof.

It will be noted that the block diagram of FIG. 1 includes a block 18, pre-amplifier sensitivity control which appears essentially as the sensitivity control in the circuit diagram in FIG. 2. When using, for example, the ultrasonic sensor head it is desirable to use a pre-amplifier but when using the inductive proximity sensor head a pre-amplifier is not necessarily required, although such pre-amplifier may be employed. In a universal circuit, which may use any of the enumerated sensor heads a pre-amplifier may be used and minimum adjustment of the pre-amplifier will prepare the universal circuit for use with the inductive proximity sensor head.

The inductive proximity sensor head combined with the universal circuit employs the principle of operation that embraces the resonant frequence principle, where the driver coil (C1) of the sensor or pick-up head is sharply tuned to the resonant condition and when any metal part is introduced into the high-frequency magnetic field established by the driver winding of the sensor head a change in the resonant frequency is produced thereby changing the amplitude of the carrier signal. This change in amplitude is used as the input signal.

It has been found that ferrous materials, when introduced in the high frequency magnetic field of the sensor head have a tendency of increasing the resonant frequency of the coil and non-ferrous metals, when introduced in the high frequency magnetic field of the sensor head have a tendency of reducing the resonant frequency of the coil.

Therefore it become obvious that by properly adjusting the frequency of the oscillator as described herein by the adjustable resistor 55 the desired amplitude change may be obtained so that selective detection may be provided as between ferrous and non-ferrous materials, as well as detecting both ferrous and non-ferrous materials, the latter combination being detectable when the frequency of the oscillator is at the resonant frequency of the winding or coil C1.

I have found that the inductive proximity sensor head may include only two windings or coils, for example coils C1 and C2 thereby eliminating coil C3. This arrangement provides somewhat less sensitive detection in that the "piece" to be detected must come closer to the sensing head or must be normally larger than the "piece" detected by the triple coil arrangement.

When employing a dual winding arrangement switch 46 will be closed, as illustrated for supplying the negative potential from the power supply to the resistor 60 of potentiometer 60/61. In addition the switch S4 will remain in its position as when a triple winding arrangement is employed.

In one arrangement of a dual winding sensor head, the windings or coils may be interconnected, and offset so that the coils are at right angles. This arrangement makes possible the detection of very small units or pieces by passing such small pieces through one of the coils. This is more clearly shown in FIGS. 5 and 5a described below.

It is previously mentioned that in order for the uni-junction transistor 77 to fire, the junction 80 should be reduced from a positive potential toward ground. This essentially reduces the potential of base two of transistor 77 from a normally relatively high positive potential to a potential approaching ground.

With this in mind another type of sensor may be connected, and employed with the universal circuit, as by the jack-plug connection 105, shown connected herein. In the previous description of FIG. 2 the block 30 was not mentioned, however, block 30 illustrates one type of circuitry for providing an on/off type of sensor, which may detect presence or passage of a "piece" or unit upon actuation of the normally open switch, 106. If it be desired to employ an on/off type sensor, such sensor may be connected as shown (electrically to junction 80). An on/off type sensor may include any actuable switch either mechanical, electric or electronic which when actuated, may supply a ground connection via the parallel connected resistor and capacitor to the base-two terminal of the unijunction transistor 77 which electrically is junction 80.

Such type of sensor would upon actuation operate the digital output section 31, which may thereupon provide an output as by closure of contacts 93 through energization of the relay 92, as described or, if switch 107 is reversed a change in potential difference across resistor 108 may be used as an indication of detection. This latter indication of detection is also available when an inductive proximity sensor head is used.

If an on/off sensor head would be used with the universal detection circuit the inductive proximity sensor head may be removed as by disconnecting the coils from the jack plugs 110, 111 and 112. However, both type sensor heads could be used together but the on/off sensor head would not provide a true analog output indication.

If the on/off sensor head is used for detection purposes, without the inductive proximity sensor head, the analog output would not be indicative of the amplitude of the input signal, however, by employing control means, as will be described below, the analog output may be operated by using the digital output for operating a binary or other step-by-step counter in cooperation with a programmed control device and, in accordance with a preset program, the analog output may be operated, as desired.

Capacitor 86 will filter out the short potential change across resistor 85 when the switch 106 is closed. The length of the pulse provided by closure of the switch 106 may be controlled by the time constant of the parallel connected resistor-capacitor network in block 30.

In order to employ an ultra-sonic sensor head in lieu of the inductive proximity sensor head, the inductive proximity sensor head would be removed from its coupling, through the jack-plug connections 110, 111 and 112 and an ultra-sonic sensor head would be installed so that the transmitter is plugged into 110 and the receiver is plugged in 113.

In this respect FIG. 3 is presented which illustrates one form of ultra-sonic sensor head employing piezoelectric transducers, in its preferred arrangement.

The jack 110' in FIG. 3 would be plugged into the female section of jack-plug 110 of FIG. 2 and the jack 113' of FIG. 3 would be plugged into the female section of jack-plug 113 of FIG. 2 after removal of the coils of the inductive proximity sensor head. The switch S4 would be positioned to g thereby coupling the receiver section of the ultra-sonic sensor head to the detection circuitry.

The combination of the transducer 114 and transformer 115, including coil C4 may serve as an ultra-sonic signal generator, the coil C4 serving the same function as coil C1 in the previously described inductive proximity sensor head arrangement. With the coil C4 connected as described the coil C4 becomes part of the oscillator driver and, as part of the transformer 115 the oscillator frequency signal is induced into the secondary of transformer 115 which drives the transducer 114, thereby generating ultra-sonic waves, the frequency of which are the frequency of the oscillator.

Normally, the transducer 114 would be so positioned so as to direct the generated ultra-sonic waves to transducer 116. When transducer 116 is receiving, the ultra-sonic waves, current is developed in the coil P1 of transformer 117 and this current is induced in the coil S1.

Coil S1 is coupled between the base of transistor 119 and ground. Reception of ultra-sonic waves causes transistor 119 to alternately conduct and cut off at the oscillator frequency. Thus the potential at junction 121 is a pulsating positive potential which is applied through jack-plug 113 position g to the arm of switch S4 which is assumed connected to g, to capacitor 56. In this arrangement capacitor 56 and resistor 68 combine to form a filter which provides a positive signal for overcoming the negative bias applied to the base of transistor 62 via the sensitivity control, adjustable resistor 60.

When a "piece" or unit passes between the transducers 114 and 116 or otherwise interrupts the ultra-sonic beam between the two transducers the signal ceases and junction 121 no longer swings at the oscillator frequency. This DC at junction 121 is therefore blocked by capacitor 56 and is seen by transistor 62 as a decrease in amplitude, the negative signal from the base bias or sensitivity control 60 driving transistor 62 to cut-off.

The remaining circuit functions of the universal detection circuit are the same as those previously described.

It suffices to say that the conditions for detecting ferrous and/or non-ferrous materials, as described relative to the inductive proximity sensor head does not apply to the ultra-sonic sensor head. However, the ultra-sonic sensor head may be used to detect any material which may interrupt the sonic beam between the two transducers.

It will be noted that the transducer 116 and the circuit associated therewith includes a pre-amplifier, that is, transistor 119 and its driving network. It has been found preferable to use a pre-amplifier in association with the sensitivity control when employing an ultra-sonic sensor head.

It will also be noted that the receiver of the ultra-sonic sensor head has been blocked off by broken line block 122.

It should be understood that the circuitry in block 122 may be used as an impact sensor head. This would require the elimination of the ultra-sonic sound wave generator of transducer 114 and the circuit associated therewith. When the impact sensor head is employed with the universal circuit forming an impact sensor detection system the driver oscillator is not necessary since the impact sensor head does not require an oscillator driver.

However, when using the receiver circuitry of block 122 for detection upon impact, a diaphragm 124, such as illustrated in FIG. 3a may be used as a "drum head" on the shell of the transducer 116' so that upon a "piece" or unit striking the diaphragm a sound is produced so as to provide sound waves which the piezoelectric transducer may convert into current across the coil P1'. FIG. 3b shows another arrangement where the shell of the transducer 116" may be extended so that a falling object, "piece" or unit may strike the shell so as to produce a sound for actuation of the impact sensor head. It is assumed that coils P1' and P1" correspond to coil P1 of FIG. 3 and that the remainder of the circuit as shown in FIG. 3 is included in the impact sensor head arrangements in FIGS. 3a and 3b.

If it be desired to employ a photo-conductive sensor head, a humidity sensor head, a thermistor head sensor head, a sensor employing the Hall effect, or a variable resistor sensor head, then any such sensor may be coupled into the driver stage 28 as by connection to the junction 130, between the base of transistor 67 and the resistor 131, shown in FIG. 2.

FIG. 4 illustrates more clearly part of the circuit of the driver stage of FIG. 2 with a photo-conductive device connected to the base of the transistor 67. The photo-conductive device 133 connects between ground and the junction 130 which is essentially between the base of transistor 67 and ground. The jack-plug 134 is shown connected, coupling the photo conductive device to terminal 130.

The type of sensor heads such as illustrated in FIGS. 4, 4a, 4b and 4c have the common characteristics of varying the resistance of the actuable element (photo-conductive cell, humidity sensitive element, thermistor or heat sensitive element and potentiometer) which may be used as indicative of detection.

In FIG. 4 the photo-conductive cell which is sensitive to light will reduce the potential at junction 130 by essentially providing a short circuit to ground, thereby shunting resistor 131.

When employing a humidity sensitive device, such as represented by block 138 in FIG. 4a a similar effect is provided in response to a humid condition. FIG. 4b illustrates a thermistor 139 which may be connected to junction 130 via the jack-plug 134 and according to the type of thermistor, whether a thermistor of positive coefficient or of negative coefficient response of the sensor head may be obtained as a result in a change of temperature, or to the presence of a piece or unit which is either colder than the ambient temperature or warmer than the ambient temperature. In the latter two cases it may be desirable that the piece or unit to be detected come in very close proximity to or to actually touch the thermistor employed.

FIG. 4c illustrates how a potentiometer may serve as a sensor head. The movable arm 140 is pivoted on the pivot 141 so as to vary the resistance between ground and the junction 130 via jack-plug connection 134. The arm may be spring loaded as by spring 142 which normally holds the actuable end of the pivotable arm 141 in a desired position, that is, with substantially the full resistance of resistor 145. When the part 144 of the arm is moved so as to pivot the arm 140 about 141 the contact arm 140 will be driven along the resistor 145 so as to reduce the resistance between the junction 130 and ground, and thereby shunt resistor 131.

FIGS. 5 and 5a illustrate two arrangements in which a dual coil inductive proximity sensor may be effectively employed in lieu of the triple coil arrangement shown in FIG. 2. FIG. 5 shows that coil C1' and coil C2' may be unlinked and offset 90 degrees with respect to each other. Arrow 150 represents that the piece or unit to be detected may be passed through coil C1'. Coil C1' would be connected to the jack plug 110" while the ground lead, represented by a minus sign would be connected to a common ground. Coil C2' would be connected to the jack plug 111" with the other lead returned a common ground as represented by the minus sign.

FIG. 5a shows the coils C1" and C2" interlinked and offset 90 degrees with respect to each other. The jack plugs 110" and 111" would be connected to the jack plugs 110 and 111 respectively of FIG. 2. The arrangement illustrated in FIG. 5a may be used to detect very small pieces as they pass through one of the coils as indicated by arrow 151. In the dual coil arrangement switch S4 would be positioned to f and switch 46 would be closed, as illustrated.

The indicative proximity sensor head may be employed with a single winding or coil arrangement as by using coil C1 (FIG. 2) and positioning switch S4 in position e as illustrated. The coils C2 and C3 would be removed and the switch 46 would be closed as illustrated. The single coil arrangement provides a low impedance input through capacitor 56. This low impedance input into capacitor 56 permits stacking of a plurality of detection control circuits, that is, the part of the circuit of FIG. 2 to the right of capacitor 56, and operating the plurality of detection control circuits from a common sensor head (a single sensor head). By adjusting the respective sensitivity control 60/61 of the respective detection control circuits to different levels, the stacked detection control circuits may be made to respond to different signal amplitudes respectively which may correspond to different spacing between the sensor head and a positioning table or tool holder, for example.

In addition, the single coil sensor head arrangement permits use of a long connecting cable between the sensor head and the jack plug connection 110. The single coil sensor head arrangement permits use of a two conductor cable which normally has a low capacitance effect avoiding upsetting the resonance condition of the winding or coil of the sensor head, which winding or coil is part of the oscillator circuit.

Figure 6:
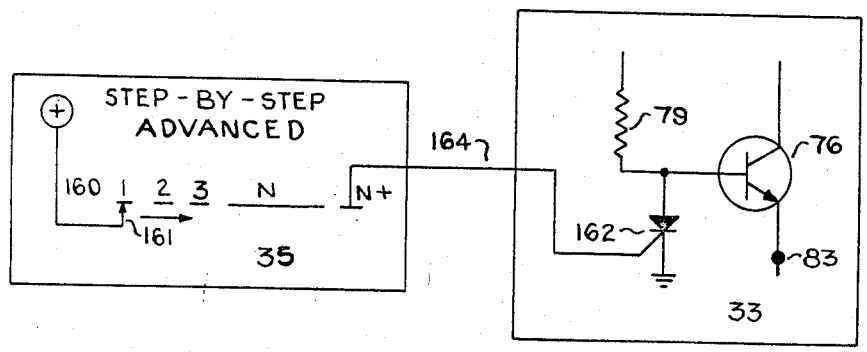
FIG. 6 is a representation of one type of program controller which may control the analog output section.

Referring to FIG. 6 a program control, such as represented by block 35 in FIG. 1 is illustrated, in simple form as a familiar stepping switch 160 which may include a plurality of positions N+. Such stepping switch may include one or several banks of switches, if desired, with the several banks of switches cascaded so as to provide any count desired. The wiper 161 is illustrated as connected to positive power and is assumed to be advanced step-by-step by a stepping motor or solenoid (not shown). The letter N represents an unknown quantity of contact positions, while N+ represents the last position.

Position N+ is connected to block 33 via lead 164 and is illustrated as controlling the silicone controlled rectifier 162 connected between the base of transistor 76 and ground. When the arm or wiper 161 contacts the contact position N+, power is applied to the rectifier 162 which is then opened so as to apply ground potential to the base of transistor 76 thereby driving transistor 76 to cut off. With transistor 76 driven to cut-off the analog output (across terminals 83 and 84) drops to substantially ground potential. The potential across terminals 83 and 84 may be used for control purposes, as described below.

In lieu of the step-by-step advanced switch 160 a binary counter or other sequentially stepped device may be used which may provide the desired function of the stepping device.

Obviously, only part of the circuit of block 33 is shown in FIG. 6 since the full circuit (with the silicon controlled rectifier omitted) is illustrated in FIG. 2.

Figure 7:
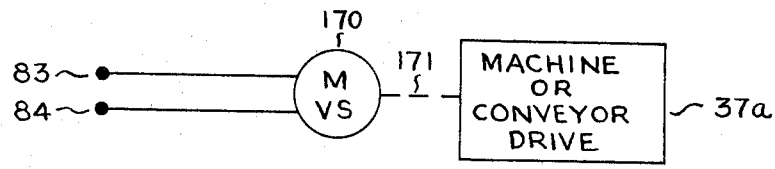
FIG. 7 is a diagram of one form of device for utilizing the analog output.
Figure 7A:
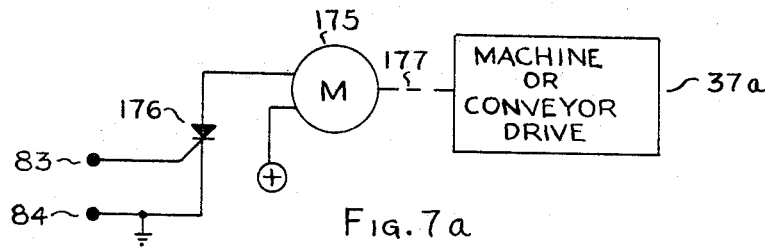
FIG. 7a is a diagram of another form of device for utilizing the analog output.

FIG. 7 and FIG. 7a show two arrangements for using the output of the analog output terminals 83 and 84. As previously mentioned, when a triple coil inductive proximity head is used as a sensor head, in association with basic circuitry the sensitivity of the detection device is relatively great. The triple coil arrangement is capable of detecting very small changes in distance between the sensor head and the material to be detected, within the detection range or zone of sensitvity of the sensor head. Minute changes of distance or a change in constant spacing between the sensor head and the detected material may be sensed as an analog output. The technique may involve positioning the sensor head so that the material detected is constantly within the range or zone of sensitivity of the sensor head.

One example, of such use, i.e., providing an analog output which is proportional to and representative of a change in distance or spacing between the sensor head and the material detected, may be found in control of a loop feed. For example, a stamping or punch machine may be fed automatically by a feeding device which feeds a strip or reel of metal to the stamping machine. Ideally, the strip of metal should be somewhat looped so that there is no back tension or stress on the cutters or punches of the stamping machine. If the strip of metal is fed too slowly the loop between the feeding device or "pay-off" and the cutters, punches or dies of the stamping machine, will be eliminated causing stress. If the strip of metal is fed too fast there is a danger of the loop becoming sufficiently large to permit the strip metal to twist. By sensing the strip of metal fed into the stamping machine the distance between the strip of metal and the sensor head may be controlled by controlling the feeding or "pay-off" device via the analog output.

In accordance with the above principle, FIG. 7 illustrates that the analog output terminals 83 and 84 may be connected to control the speed of a variable speed motor (MVS) 170. Broken line 171 represents a mechanical or other connection between the variable speed motor 170 and block 37a, representing a machine or conveyor drive or "pay-off." As the value of the analog output changes, which value may represent the distance or spacing between a strip of metal and the sensor head, the speed of the motor may be adjusted, thereby controlling operation of the machine, conveyor drive or "pay-off" device.

FIG. 7a represents an arrangement whereby the analog output 83 and 84 may control a motor 175 by controlling the driving circuit of the motor via control of a silicon controlled rectifier 176 in the driving circuit of the motor 175. The rectifier 176 may be placed in the driving circuit as desired so that the motor 175 may be turned on or off, according to the function of the motor in the operation of the production system. The motor 175 may be coupled to a machine or conveyor or other controlled device, represented by block 37a, as represented by broken line 177.

The represented usages of the analog output are not to be limited by the particular disclosure of FIGS. 7 and 7a, since wide and varied control functions may be carried out through use of the analog output as will be familiar to those skilled in the art. Obviously, the arrangements included in FIG. 7a may be combined with the control system in FIG. 6 for a program control of a machine or conveyor drive.

Thus I have shown how any of a plurality of types or modes of sensors may cooperate with a basic detection control circuit so as to form a sensor detection control system thereby essentially providing a universal sensor detection control system.

I have also shown a sensor head detection control circuit combination which, in certain of its forms includes a novel driving oscillator with one of the windings or coils of the sensor head serving as part of the sensor head as well as part of the unijunction oscillator. I have further shown a driving oscillator for use in conjunction with a sensor head which discharges through the emitter-base one circuit which provides essentially pure signals through the dual functioning winding or coil. In addition, I have shown a unijunction oscillator which includes a resistor in the base two circuit which resistor serves as a temperature compensating element.

In addition to all these novel, stated and other features, more fully described above I have shown the use of a novel feature in the field of sensor detection and control circuits. By employing the resonance principle, i.e., driving the oscillator at a frequency which is at resonance with the dual functioning coil or winding I have provided a novel detection control system which finds great utility in the industrial sensing field.

Although the range of zone of sensitivity, relative to the sensor head may be relatively short or small in certain of the combination of sensor heads and detection circuit, the size of the sensor head is normally relatively small and it is found that the sensor head used in conjunction with the basic detection circuit may be conveniently positioned in a very small space.

The size of the unit or device to be detected may range from a vary small unit or piece, such as a spring or eyelet to a large housing. Detection by an ultra-sonic sensor head, for example, is limited only by the power of the ultra-sonic beam delivered by the transmitter and the sensitivity of the receiver to so receive the generated beam. Also with the present arrangement one or more sensor heads of different type may be employed with the same detection circuitry, if desired.

Although a specific embodiment of the invention has been described in considerable detail for illustrative purposes, many modifications will occur to those skilled in the art. It is therefore desired that the protection afforded by Letters Patent be limitetd only by the true scope of the appended claims.

I claim:

1. A universal sensor detection and control device for providing a detection output in response to actuation of any one of a plurality of different type sensor-detector heads including:
   a detection circuit having at least an oscillator stage, an amplifier stage, a rectifier stage, a driver stage and an output stage,
   a first sensor head including a winding coupled to said oscillator stage so that said winding is a part of said oscillator stage and is a part of the sensor head, for changing the amplitude of the oscillator output upon actuation of said first sensor,
   means for coupling the output of said oscillator to said amplifier stage for detecting and amplifying an amplitude change of an alternating current output and for providing an alternating current signal representative of such change,
   means for coupling said alternating current signal to said rectifier stage for rectifying said alternating current signal and for providing a direct current signal proportional to said amplitude change,
   means for coupling said direct current signal to said driver stage at a first point for driving said driver stage in response to said direct current signal,
   said output stage coupled to said driver stage for providing a detection output representative of actuation in response to said driver stage so responding,
   a second sensor head, including means for generating an alternating current signal in response to actuation and coupled to said first mentioned coupling means in lieu of said first sensor head being coupled to said oscillator stage,
   a third sensor head, including a variable resistance, said resistance being variable in response to actuation, coupled to said driver stage, in lieu of said first and second sensor heads being so coupled, at a second point for driving said driver stage in response to actuation of said third sensor, and
   a fourth sensor head, including switch means normally in one condition and reversed in condition to a second condition upon actuation thereof, coupled to said driver stage, in lieu of said first, second and third sensor heads being so coupled, at a third point for driving said driver stage in response to actuation of said fourth sensor so that a detection output is provided by actuation of any one of said sensor heads so coupled to the detection device.

2. A universal sensor detection and control device as in claim 1 and in which:
   said direct current signal proportional to said amplitude change serves as an analog output which is proportional to the amplitude change of the alternating current signal applied to said coupling means by said first or said second sensor head and,
   said detection output serves as a digital output which is representative of actuation of any one of said first, second, third or fourth sensor heads.

3. A universal sensor detection and control device as in claim 1 and in which said first sensor head is at least one winding having generated a magnetic field about said winding and said winding is detuned upon actuation.

4. A universal sensor detection and control device as in claim 1 in which the frequency of oscillation of said oscillator stage is at resonance with said winding of said sensor head.

5. A universal sensor detection and control device as in claim 1 and in which said first sensor head includes:
   a first transducer for generating a sonic beam at the frequency of said oscillator stage,
   a second transducer for generating an electric signal at the frequency of said oscillator stage in response to reception of said sonic beam, and
   means for coupling the electric signal so generated by second transducer to the first mentioned said means for coupling.

6. A universal sensor detection and control device as in claim 1 and in which said second sensor head includes:
   a transducer for generating an alternating current signal in response to sound waves,
   means coupled to said transducer for generating sound waves in response to an impact thereon and,
   means for coupling said alternating current signals so generated to the first mentioned said means for coupling.

7. A universal sensor detection and control device as in claim 1 and in which said oscillator stage includes:
   a unijunction transistor having a first base, a second base and an emitter and coupled as a free running oscillator,
   a capacitor coupled between said first base and said emitter for discharging said capacitor through said first base-emitter circuit,
   a resistance coupled between said emitter and a source of power for changing said capacitor,
   a resistance coupled between said second base and said source for stabilizing said oscillator and,
   said winding of said first sensor head coupled between said first base and a return.

8. A universal sensor detection and control device as in claim 5 and in which said oscillator stage includes:
   a unijunction transistor having a first base, a second base and an emitter and coupled as a free running oscillator,
   a capacitor coupled between said first base and said emitter for discharging said capacitor through said first base-emitter circuit,
   a resistance coupled between said emitter and a source of power for changing said capacitor,
   a resistance coupled between said second base and said source for stabilizing said oscillator and,
   said winding of said second sensor head is the winding for energizing said first transducer and said winding is coupled between said first base and a return.

9. A universal sensor detection and control device as in claim 1 and in which said first sensor includes:
   a first winding, a second winding and a third winding,
   said first winding being coupled so as to be part of said oscillator circuit and,
   the frequency of said oscillator is at resonance with said first coil.

10. A universal sensor detection and control circuit as in claim 1 and in which said output stage includes:
    a unijunction transistor having a base one, base two and an emitter, and connected as a multivibrator,
    a first resistor coupled between said emitter and said base one,
    a first capacitor,
    a relay,
    said capacitor and said relay serially connected in shunt with said resistor,
    a second resistor coupling said emitter to said base two,
    a second capacitor coupling said base one to said base two,
    said base two coupled to said driver stage and,
    said first resistor and first capacitor form an RC timing circuit for restoring said multivibrator.

11. A universal sensor detection and control device as in claim 9 and in which said amplifier stage includes:

threshold means for providing sensitivity control of said amplifier for adjusting the sensitivity of said amplifier to the amplitude change of said alternating current signal and further including:
a diode coupling said third winding to said threshold for providing a control voltage.

12. A universal sensor detection and control device as in claim 1 and in which said third sensor includes:
a variable resistive element sensitive to light for changing the resistance of said element in response to reception of light and,
a source of light.

13. A universal sensor detection and control device as in claim 1 and in which said third sensor includes:
a potentiometer having a resistor,
an arm movable along said resistor for varying the resistance of said potentiometer,
means for moving said arm along said resistor upon actuation, and
means for restoring said arm to its normal position after being so actuated.

14. A universal sensor detection and control device for providing a detection output in response to actuation of any one of a plurality of different type sensor-detector heads including:
a detection circuit having at least an oscillator stage, an amplifier stage, a rectifier stage, a driver stage and an output stage,
a first sensor head including at least a winding coupled to said oscillator stage so that said winding is a part of said oscillator stage and is a part of said first sensor head, said winding coupled to said oscillator for changing the amplitude of the oscillator output upon actuation of said first sensor,
means for coupling the output of said oscillator to said amplifier stage for detecting and amplifying an amplitude change of an alternating current output and for providing an alternating current signal representative of such change,
means for coupling said alternating current signal to said rectifier stage for rectifying said alternating current signal and for providing a direct current signal proportional to said amplitude change,
means for coupling said direct current signal to said driver stage at a first point for driving said driver stage in response to said direct current signal,
said output stage coupled to said driver stage for providing a detection output representative of actuation in response to said driver stage so responding,
a second sensor head, including at least means for generating an alternating current in response to actuation and coupled to said first mentioned coupling means,
a third sensor head including at least a variable resistance said resistance being variable in response to actuation and coupled to said driver stage at a second point for driving said driver stage in response to actuation of said third sensor, and
a fourth sensor head, including switch means normally in one condition and reversed in condition to a second condition upon actuation thereof and coupled to said driver stage at a third point for driving said driver stage in response to actuation of said fourth sensor so that a detection output is provided in response to actuation of any one of said sensor heads so coupled to the detection device.

15. A detection and control device for providing a detection output in response to actuation of a sensor detector head including:
a free running oscillator for driving a sensor head,
a sensor head including a first winding, a second winding and a third winding in close relation with each other,
said first winding coupled to said oscillator so as to be a part thereof for driving said sensor head and for changing the amplitude of the oscillator output upon actuation of said sensor head,
an amplifier detector for detecting an amplitude change of the oscillator and for providing an output representing such amplitude change,
said second winding coupled to said amplifier detector for applying the output of said oscillator to said amplifier detector,
a threshold control coupled to said amplifier detector for controlling the sensitivity of said amplifier detector,
means for coupling said third winding to said threshold for maintaining the sensitivity of said amplifier detector substantially constant over a wide range of temperature affecting said sensor head,
a rectifier coupled to said amplifier for providing a direct current signal in response to the output of said amplifier detector, said direct current signal being proportional to the amplitude change so detected, and
output means coupled for receiving said direct current signal and for providing a detection output representing actuation of said sensor head.

16. A detection and control device as in claim 15 and in which said device further includes:
means responsive to said direct current signal for providing a direct current output proportional to said direct current signal for providing an analog output.

17. A universal sensor detection and control system for controlling operation of an automated or semi-automated device in response to actuation of any one of a plurality of different type sensor-detector heads including:
an automated or semi-automated device having a cycle of operation,
a detection circuit having at least an oscillator stage, an amplifier stage, a rectifier stage, a driver stage and an output stage,
a first sensor head including at least a winding coupled to said oscillator so that said winding is part of the oscillator stage and is part of the sensor head for changing the amplitude of the oscillator output upon actuation of said first sensor head, said first sensor head being positioned for actuation by said automated or semi-automated device upon occurence of a particular operation in the said cycle of operation,
means for coupling said amplitude change to said amplifier stage for detecting and amplifying an amplitude change of an alternating current signal and for providing an amplified alternating current signal representative of such change,
means for coupling said amplified alternating current signal to said rectifier stage for rectifying said alternating current signal and for providing a direct current signal proportional to said amplitude change,
means for coupling said direct current signal to said driver stage at a first point for driving said driver stage in response to said direct current signal,
said output stage coupled to said driver stage for providing a detection output pulse representative of said actuation in response to said driver so responding,
programmed cyclic means, having a step-by-step advanced predetermined cycle, coupled to said output stage for sequentially advancing step-by-step in response to a sequence of detection output pulses and for providing a control signal in response to completion of said predetermined cycle for controlling operation of said automated or semi-automated device, and
means for coupling said control signal to said device for controlling said device,
a second sensor head including means for generating an alternating current signal in response to actuation by impact, said second sensor head positioned for actuation by a particular operation of said cycle of operation of said automated or semi-automated device, means for coupling said alternating current signal so generated upon impact to said amplifier stage upon absence of said amplitude change being so coupled, a third sensor head, including a variable resistance, said resistance being variable in response to actuation, said third sensor head positioned for actuation by a particular operation of said cycle of operation of said automated or semi-automated device, said third sensor head coupled to said driver stage, in absence of said amplitude change being so coupled and in absence of said alternating current signal generated by said second sensor head being so coupled, at a second point for driving said driver stage in response to actuation of said third sensor head, and a fourth sensor head, including switch means having two conditions and normally in one condition and positioned to be reversed to the second of said two conditions by actuation in response to a particular operation of said cycle of operation of said automated or semi-automated device, said fourth sensor head coupled to said driver stage, in absence of said amplitude change being so coupled and in absence of said alternating current signal generated by said second sensor head being so coupled and in absence of said third sensor head being so coupled, at a third point for driving said driver stage in response to actuation of said fourth sensor head.

18. A universal sensor detection and control system as in claim 17 and in which said first sensor includes:
a magnetic field about said winding having a zone of sensitivity inversely proportional to distance and,
said amplitude change of said oscillator output is inversely proportional to the spacing between said first sensor head and the actuating medium and,
said direct current signal is a measure of the spacing between said first sensor head and said actuating medium.

19. A universal sensor detection and control system as in claim 17 and in which said amplifier stage includes:
threshold means for providing a sensitivity control of said amplifier for adjusting the sensitivity of said amplifier to the amplitude change of said alternating current signal.

20. A sensor detection and control system for controlling operating of an automated or semi-automated device in response to actuation of a sensor detector head by the device so controlled including:
an automated or semi-automated device having a cycle of operation,
a free running oscillator coupled to said sensor detector head for driving said sensor,
said sensor detector head positioned for sensing a particular phase of said cycle of operation and for varying the drive of said sensor detector head in response to said particular phase occurring,
an amplifier detector for detecting such variation of drive and for providing an alternating current output in response to such variation, and proportional thereto, a rectifier for providing a direct current signal in response to said alternating current output, said direct current signal being proportional to the value of said alternating current signal,
analog output means coupled to said rectifier for providing an analog output proportional to the variation of drive of said sensor head,
means responsive to the value of said analog output for controlling operation of said automated or semi-automated device,
digital output means coupled to said rectifier for providing a detection pulse in response to said direct current signal and,
means responsive to said detection pulse for providing a count indication of the number of cycles of operation of said automated or semi-automated device.

21. A sensor detection and control system as in claim 20 and in which said amplifier detector includes:
a sensitivity control for limiting the value of the alternating current output,
and said means responsive to said detection pulse includes:
means for providing a control signal in response to a predetermined count indication,
and means for coupling said control signal to said analog output means for simulating variation of drive of said sensor detector head.

22. A sensor detection and control system as in claim 20 and said free running oscillator includes:
a unijunction transistor having a base one, a base two and an emitter,
a capacitor for coupling said emitter to said base one for discharging said capacitor through the emitter base-one circuit,
a charging resistance coupled to said emitter,
a source of power coupled to said charging resistance,
a second resistor coupling said source to said base two,
a return, and said sensor detector head includes at least a winding, said winding coupled between said base one and said return for forming a part of said oscillator and said sensor detector head.

23. A sensor detection and control system as in claim 20 and in which said digital output means includes:
a unijunction transistor having a base one, a base two and an emitter connected as a multivibrator,
a first resistor connected between said emitter and said base one, for adjusting return of said multivibrator,
a capacitor and an impedance element in series circuit,
said capacitor-impedance series circuit shunting said first resistor for providing an indication across said impedance upon discharge,
a second resistor connected between said base two and said emitter for changing said capacitor, and
said base two coupled to said rectifier for receiving said direct current signal.

No references cited.

JOHN W. CALDWELL, *Primary Examiner.*

D. MYER, *Assistant Examiner.*